Figure 1:
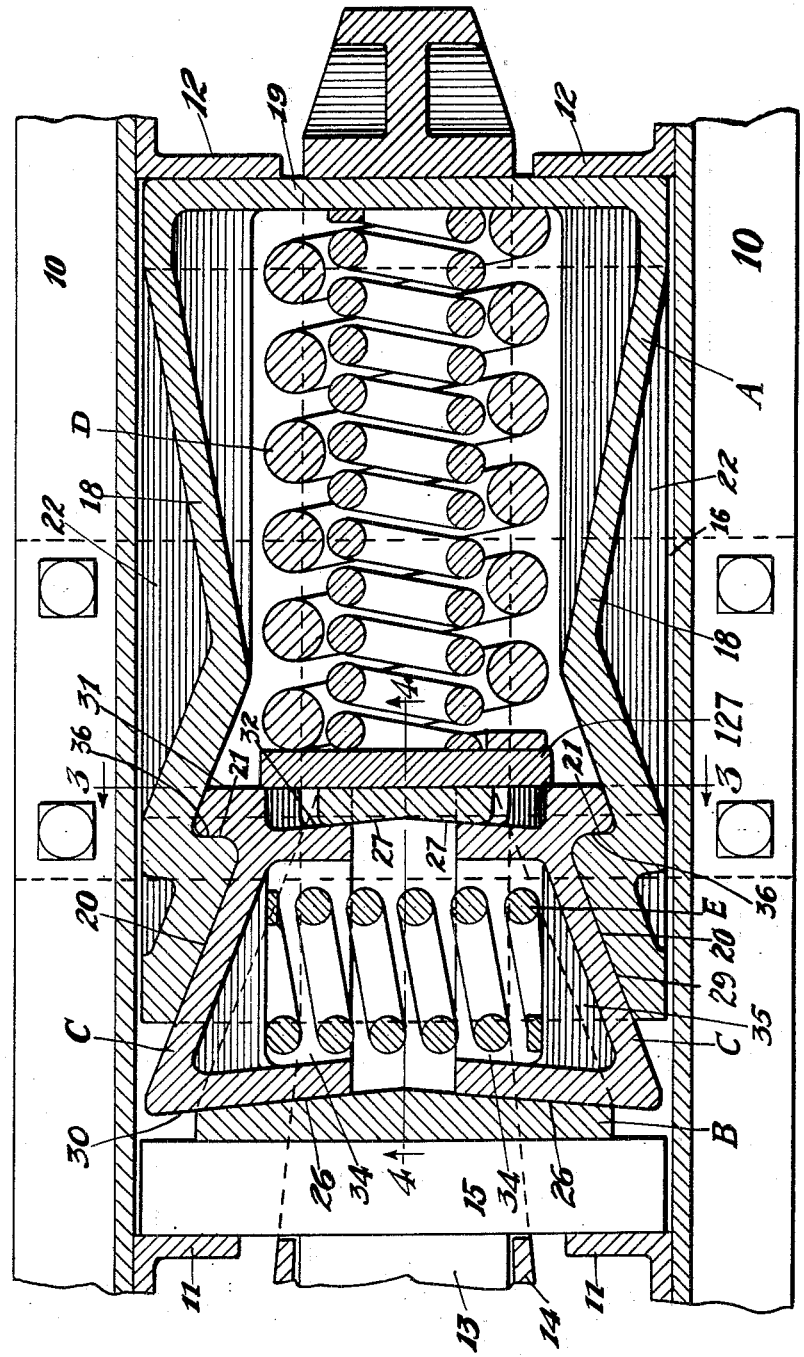

June 16, 1931.  R. J. OLANDER  1,809,908

FRICTION SHOCK ABSORBING MECHANISM

Filed Sept. 12, 1929  2 Sheets-Sheet 2

Witness
Wm. Geiger

Inventor
Roland J. Olander
By Joseph Harris
his Atty.

Patented June 16, 1931

1,809,908

UNITED STATES PATENT OFFICE

ROLAND J. OLANDER, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed September 12, 1929. Serial No. 392,055.

This invention relates to improvements in friction shock absorbing mechanisms.

One object of the invention is to provide a friction shock absorbing mechanism including a friction wedge casing, friction shoes or blocks cooperating therewith, movement of the blocks inwardly of the casing being spring resisted and being forced to laterally approach by inclined friction wedge surfaces on the casing during relative movement of the casing and blocks, lateral approach of the shoes being also spring resisted, wherein means is provided for assuring proper alinement of all of the parts of the mechanism at all times preventing objectionable side thrusts which would result in displacement of the parts of the gear.

A further object of the invention is to provide a friction shock absorbing mechanism including a casing, open at one end, and a main follower at the open end of the casing, the casing and follower being relatively movable toward and away from each other, the casing having opposed interior, inwardly converging friction wedge surfaces at opposite sides thereof; friction wedge blocks movable inwardly of the casing with said follower; spring means opposing lateral approach of the blocks; a carrier for the blocks and spring means, the carrier having a front wall interposed between the follower and the front ends of the blocks, the front wall of the carrier separating the follower from the blocks, thereby preventing any tendency to displace the follower laterally or vertically, with resultant damage to the gear, and further protecting the follower from wear; and a main spring resistance opposing movement of the blocks inwardly of the casing, whereby the blocks are held in frictional contact with the front wall of the carrier.

Another object of the invention is to provide a friction shock absorbing mechanism of the character indicated in the preceding paragraph, having exceptionally great capacity by the provision of relatively high frictional resistance by engagement of the blocks with friction surfaces on the carrier in addition to engagement with friction surfaces of the casing, and wherein the cooperating friction surfaces on the carrier wall and blocks are inclined transversely of the mechanism to effect inward displacement of the blocks relatively to the carrier produced by lateral approach of the blocks to advance the blocks ahead of the carrier to assure compression of the main spring resistance at all times by the blocks and maintain frictional contact of the blocks with the friction surfaces of the carrier.

Other objects of the invention will more clearly appear from the description and claims hereinafter following.

Figure 2:
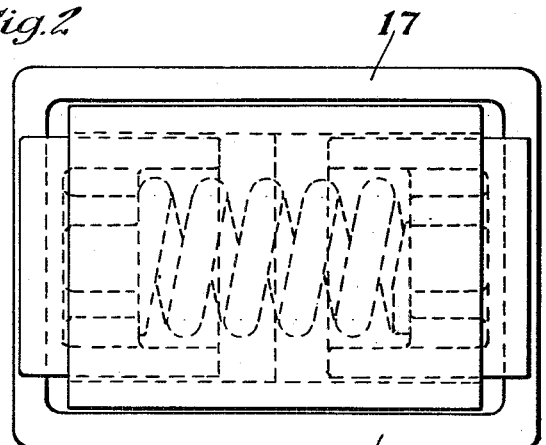
Figure 3:
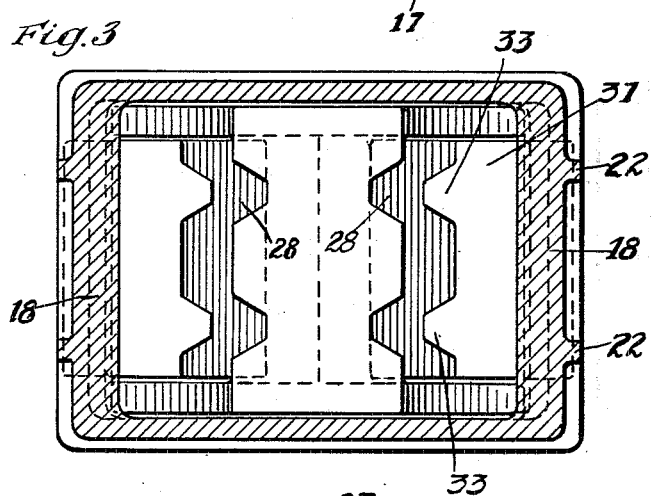
Figure 4:
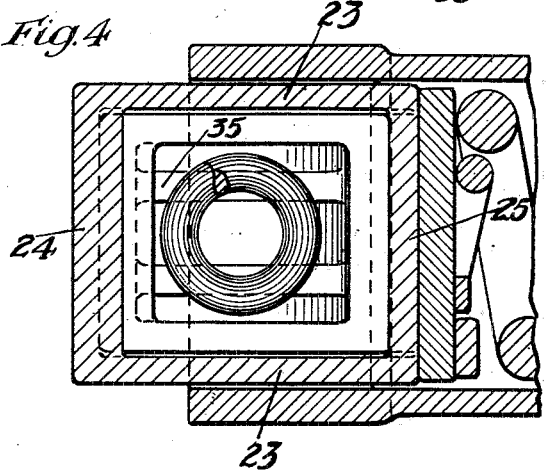

In the drawings, forming a part of this specification, Figure 1 is a horizontal, longitudinal sectional view through a portion of the underframe structure of a railway car illustrating my improvements in connection therewith. Figure 2 is a front end elevational view of the improved friction shock absorbing mechanism illustrated in Figure 1. Figure 3 is a vertical, transverse sectional view corresponding substantially to the line 3—3 of Figure 1, and Figure 4 is a longitudinal, vertical sectional view of the front end portion of my improved shock absorbing mechanism, corresponding substantially to the line 4—4 of Figure 1.

In said drawings, 10—10 indicate channel-shaped center sills of a railway car underframe to the inner sides of which are secured front stop lugs 11—11 and rear stop lugs 12—12. The inner end of the coupler shank is designated by 13 and has operatively connected thereto a hooded yoke 14 of well known form. My improved friction shock absorbing mechanism, as well as a front main follower 15 of well known form, are disposed within the yoke and the yoke in turn is supported by a detachable saddle plate 16 secured to the bottom flanges of the center or draft sills.

My improved shock absorbing mechanism comprises broadly a friction casing A, a pressure-transmitting carrier B, a pair of friction wedge blocks C—C, a main spring resistance D and a spring resistance E opposing lateral approach of the friction wedge blocks.

The casing A is of substantially rectangular box-like form having horizontally disposed, longitudinally extending spaced top and bottom walls 17—17, vertically disposed, longitudinally spaced side walls 18—18 and a transverse rear end wall 19. The end wall 19 cooperates with the stop lugs 12 in the manner of the usual rear follower. As most clearly shown in Figure 1, the forward sections of the side walls 18 converge inwardly with respect to each other and have opposed flat interior friction surfaces 20—20 at the forward portion of the casing, which diverge outwardly. The wall sections of the casing immediately in the rear of the friction surfaces 20 are offset outwardly as shown, thereby providing shoulders 21—21 for a purpose hereinafter pointed out. Rearwardly of the shoulders 21, the side walls have short sections which converge inwardly of the mechanism, the rear end portion of the side walls converging outwardly as shown. The side walls are preferably reinforced lengthwise by spaced ribs 22—22.

The carrier B, which is telescoped within the front end of the casing A, has spaced top and bottom walls 23—23, a vertical front end wall 24 and a vertical rear wall 25. As shown in Figure 1, the rear wall 25 is narrower than the front wall 24 and the edges of the top and bottom walls converge rearwardly, thereby adapting the carrier for movement inwardly of the casing without engagement of the sides of the carrier with the friction wedge faces 20—20 of the casing. The front wall 24 of the carrier has a flat outer face which bears directly on the inner side of the main follower 15. On the inner side, the wall 24 is provided with transversely inclined friction surfaces 26—26 which are adapted to cooperate with the friction wedge blocks C—C, as hereinafter more specifically pointed out. The rear wall 25 of the carrier has a flat rear surface which bears directly on a spring follower plate 127 which cooperates with the main spring resistance D. On the inner side, the end wall 25 is provided with transversely inclined surfaces 27—27 which are respectively parallel to the friction surfaces 26—26 of the front wall 24. It will be evident that lateral, inwardly inclined guideways for the friction wedge blocks C are thus provided between the front and rear walls 24 and 25 of the casing. As most clearly illustrated in Figure 3, the rear wall is notched on opposite sides as indicated at 28—28 to accommodate certain portions of the friction wedge blocks as hereinafter more clearly pointed out.

The friction wedge blocks C—C are disposed at opposite sides of the mechanism within the casing and are mounted within the carrier B. The blocks C are of similar design, each having a flat friction wedge face 29 at the outer side cooperating with the corresponding friction wedge face 20 of the casing and correspondingly inclined thereto. At the forward end each block has a transversely inclined flat friction surface 30 which engages the corresponding friction surface 26 of the end wall 24 of the carrier and is correspondingly inclined thereto. At the rear end each block has a flat face 31 adapted to cooperate with the spring follower plate 127. Each block also has a rear face 32 forwardly offset with respect to the flat face 31 thereof, the face 32 being inclined laterally, corresponding in the inclination to the front face 30 and cooperating with one of the inclined faces 27 of the rear wall 25 of the carrier. As most clearly illustrated in Figure 3, the flat face 31 of each block C has a pair of laterally inwardly extending portions 33—33 which are adapted to enter the corresponding notches 28 of the wall 25 when the block is moved laterally inwardly. The extensions 33 of the face 31 are provided in order to obtain bearing contact of the blocks with the spring follower 27, at all times. The two blocks C are spaced apart in the normal condition of the mechanism as clearly shown in Figure 1, and are held yieldingly separated by the transversely disposed spring resistance E which has the opposite ends thereof accommodated in pockets 34—34 provided in the blocks C. As shown in Figures 1 and 4, the pocket of each block C has longitudinally disposed ribs 35—35 in the bottom thereof providing flat abutment faces for the corresponding end of the spring E.

The main spring resistance D comprises a relatively light inner coil and a heavier outer coil having the opposite ends thereof bearing respectively on the rear end wall 19 of the casing and the inner side of the spring follower plate 127. The spring resistance D, as well as the spring resistance E, are preferably placed under initial compression to maintain contact between the friction surfaces of the various parts of the mechanism at all times.

Outward movement of the friction wedge blocks is limited by retaining means in the form of transverse shoulders 36—36 on the blocks, cooperating with the shoulders 21 of the casing walls. The shoulders 36 of the blocks are formed by laterally outwardly extended portions at the rear ends of the blocks as clearly illustrated in Figure 1.

The operation of my improved shock absorbing mechanism is as follows: During either a buffing or draft action, the main follower 15 and the casing A will be moved relatively toward each other, the follower being forced inwardly in buff while the casing A is held in fixed position by the stop lugs 12 and the casing being pulled forwardly in draft by the yoke while the follower 15 is held in fixed position by the front stop lugs 11. Upon relative longitudinal movement of the follower 15 and the casing A, the carrier B will be forced rearwardly, carrying the friction wedge blocks C—C therewith. Inasmuch as the inner ends of the friction wedge blocks bear directly on the spring follower 127, the main spring resistance D will be directly compressed by inward movement of the friction wedge blocks. During the movement of the blocks C—C inwardly of the casing A, the same will slide on the friction surfaces 20 of the casing and due to the inclination of these surfaces will be forced to approach each other laterally, thereby compressing the spring resistance E. Due to the arrangement of transversely inclined friction surfaces 26—26 on the carrier, the blocks C will be forced rearwardly with respect to the carrier during the lateral approach of the same, that is, the blocks will move lengthwise of the mechanism at a more rapid rate of speed than the carrier B, the blocks thus being projected rearwardly of the carrier, forcing the spring follower 127 away from the end wall of the carrier and directly effecting compression of the main spring resistance D. The described action will continue until relative approach of the main follower 15 and the casing A is limited by engagement of the follower with the front end of the casing, whereupon the casing acts as a column load-transmitting member, delivering the load directly to the stop lugs of the draft sills and preventing excessive compression of the main spring resistance. When the actuating force is reduced in release, the spring resistance E will force the blocks C laterally apart, while the main spring resistance carries blocks outwardly of the casing A and restores the parts to the position shown in Figure 1, outward movement of the blocks being limited by engagement of the shoulders 36 thereof with the shoulders 21 of the side walls of the casing.

As will be evident, during the compression of the mechanism the blocks C are truly guided in the carrier between the cooperating parallel guide walls 26 and 27 thereof and the friction surfaces 30 of the blocks are held in contact with the friction surfaces 26 of the carrier by the action of the main spring resistance D. This frictional contact is assured at all times through the projection of the blocks rearwardly of the carrier by the action of the cooperating inclined surfaces 26 and 30 of the carrier and blocks.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a casing and a main follower, relatively movable toward and away from each other lengthwise of the mechanism, the casing having opposed interior, inwardly converging friction wedge faces; of a pair of friction wedge blocks having wedging engagement with the casing; spring means opposing lateral approach of the blocks; a carrier for the blocks, the carrier having a transverse front end wall interposed between the main follower and the front ends of the blocks, and having frictional engagement therewith; and spring resistance means within the casing opposing inward movement of the blocks.

2. In a friction shock absorbing mechanism, the combination with a casing and a main follower, relatively movable toward and away from each other lengthwise of the mechanism; a casing having opposed interior inwardly converging wedge friction surfaces; of a pair of friction wedge blocks having wedging engagement with the casing; spring means opposing lateral approach of the blocks; a carrier having a transverse front end wall interposed between the main follower and the front ends of the blocks and having frictional engagement with the latter; guide means for the wedge blocks including said front end wall and a cooperating rear wall on the carrier; and spring resistance means within the casing opposing inward movement of the blocks.

3. In a friction shock absorbing mechanism, the combination with a casing having opposed, interior inwardly converging friction wedge surfaces; of a carrier adapted to receive the actuating force, said carrier having transversely arranged inclined friction surfaces; friction wedge blocks cooperating with the friction surfaces of the shell and carrier; spring means opposing lateral movement of the blocks; and a main spring resistance opposing inward movement of the blocks.

4. In a friction shock absorbing mechanism, the combination with a casing having interior, inwardly converging friction wedge surfaces; of a carrier adapted to receive the actuating force, said carrier having a transversely disposed wall provided with transversely arranged, inwardly inclined friction surfaces; friction wedge blocks supported and guided by the carrier for lateral movement, said blocks engaging said transversely disposed friction surfaces of the carrier and cooperating with the friction wedge surfaces of the casing; spring means interposed between said friction wedge blocks; and a main spring resistance opposing inward movement of the blocks, portions of said blocks being projected inwardly beyond the carrier by said inclined friction surfaces during relative lateral approach of the blocks.

5. In a friction shock absorbing mechanism, the combination with a casing and a main follower movable relatively toward and away from each other lengthwise of the mechanism; of a carrier having spaced front and rear end walls and top and bottom walls, said front end wall bearing directly on the main follower and having inclined friction surfaces on the inner side thereof; a main spring resistance within the casing; a pair of friction wedge blocks at opposite sides of the mechanism guided between the front and rear end walls of the carrier, having frictional engagement with said front end wall and both wedging and frictional engagement with the wedge surfaces at the corresponding sides of the casing, said blocks having rearwardly extending portions bearing on the main spring resistance; and spring means in the carrier interposed between the friction wedge blocks and opposing lateral approach of the same.

In witness that I claim the foregoing I have hereunto subscribed my name this 26th day of August, 1929.

ROLAND J. OLANDER.